Nov. 16, 1948.  A. F. HICKMAN  2,453,981
HYDRAULIC CLUTCH
Filed Nov. 15, 1944  2 Sheets-Sheet 1
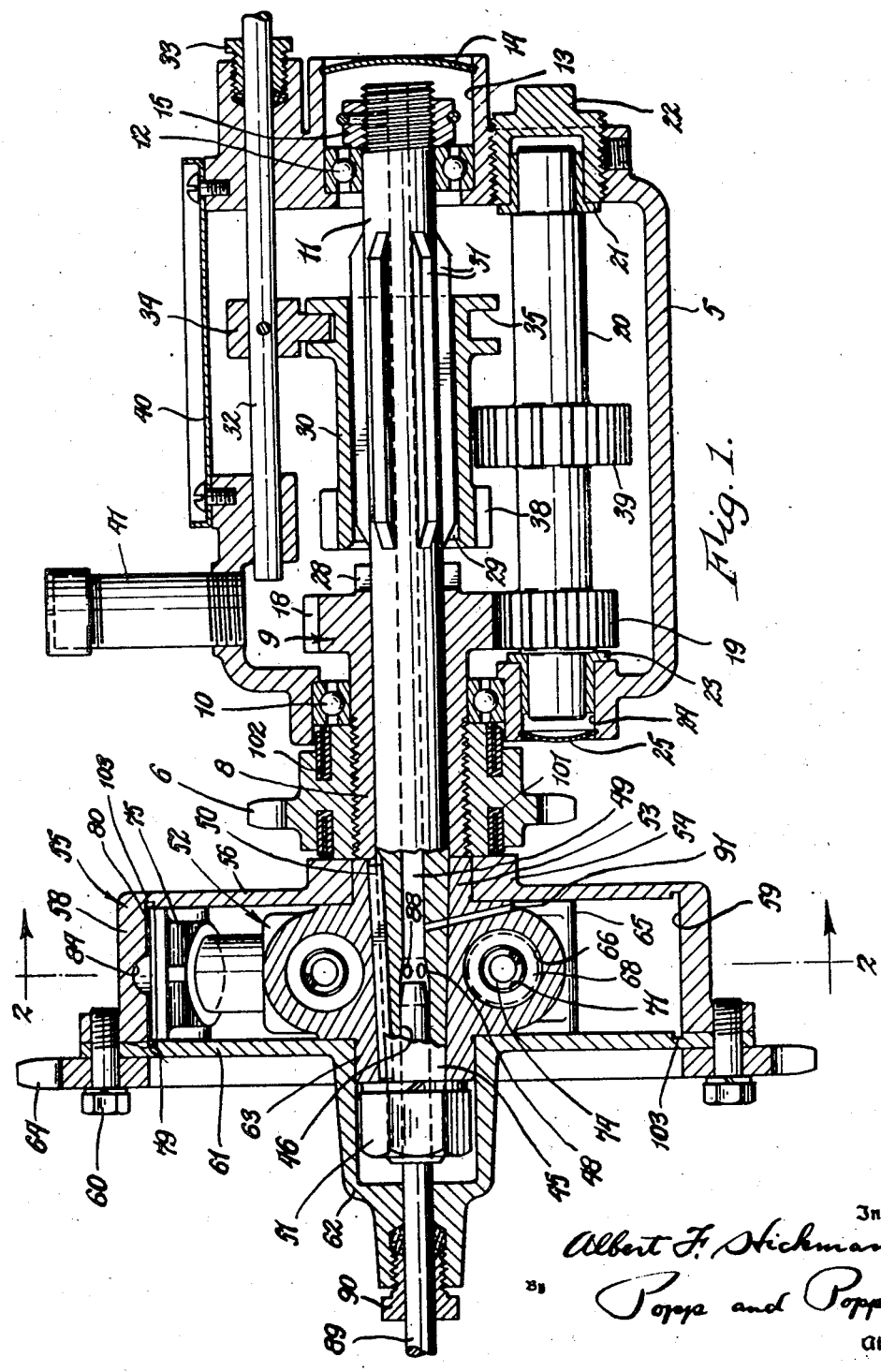

Nov. 16, 1948.  A. F. HICKMAN  2,453,981
HYDRAULIC CLUTCH
Filed Nov. 15, 1944  2 Sheets-Sheet 2
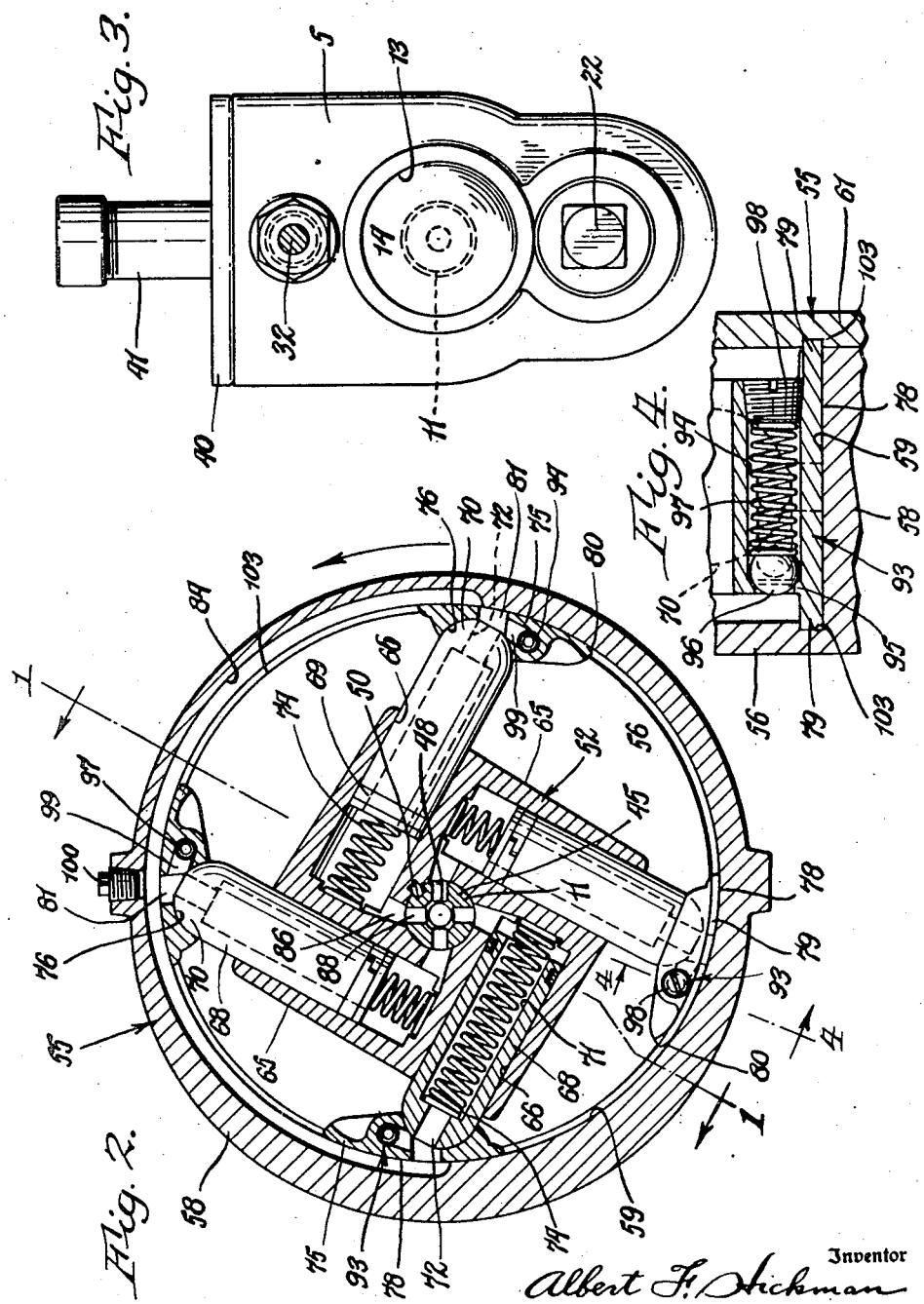
Inventor
Albert F. Hickman
By Popp and Popp
Attorneys Patented Nov. 16, 1948

2,453,981

UNITED STATES PATENT OFFICE 2,453,981

HYDRAULIC CLUTCH

Albert F. Hickman, Eden, N. Y., assignor to Hickman Pneumatic Seat Co. Inc., Eden, N. Y., a corporation of New York Application November 15, 1944, Serial No. 563,488

12 Claims. (Cl. 192—60)

1

This invention relates to a hydraulic clutch which can be used alone or in combination with a mechanical transmission to releasably transmit power from a driving member to a driven member.

One of the principal objects of the invention is to provide such a hydraulic clutch which is of simple, low cost construction and which will stand up under conditions of severe and constant use without getting out of order or requiring repairs.

Another object is to provide such a clutch which will transmit heavy loads without danger of breakage.

Another object is to provide such a clutch which can be operated to provide any desired degree of slippage without appreciable wear upon the parts.

A further purpose is to provide such a clutch which can be designed to provide a coupling in one direction, such as from the driving to the driven member, but is substantially completely open or uncoupled to reverse torque forces, that is, from the driven to the driving member.

Another object is to so arrange the pistons within the clutch so that a minimum of side thrust or other undesirable forces are imposed upon the pistons or other internal parts of the clutch.

Another purpose is to provide a simple and effective control for the movement of the liquid through the clutch so that the degree of slippage of the clutch can be accurately controlled.

Another object is to provide such a clutch in which the clutch housing is maintained full of oil at all times, oil being supplied from a large reservoir which includes the casing of the mechanical transmission through which the clutch operates.

Another object is to provide such a clutch which recirculates a part of its operating fluid through the adjacent casing for the mechanical transmission thereby to maintain proper lubrication throughout; to utilize the mechanical transmission gear case as a large reservoir for the clutch; and to utilize the full external area of both the clutch and mechanical transmission casings to cool the liquid.

Another object is to provide such a clutch in which parts cannot become misplaced even if spring breakage should occur.

Other objects and advantages will appear from the following description and drawings in which:

Fig. 1 is a longitudinal sectional elevation through a transmission including a hydraulic clutch embodying my invention, this section being taken on line 1—1, Fig. 2.

Fig. 2 is a vertical transverse sectional view, taken on line 2—2, Fig. 1.

Fig. 3 is an end elevational view.

Fig. 4 is an enlarged fragmentary sectional view, taken on line 4—4, Fig. 2.

The hydraulic clutch is shown as mounted on the casing 5 of a change speed transmission driven from a sprocket 6 which is fast to the tubular hub 8 of a gear 9 which hub is shown as journaled in one end of the casing 5 by a ball bearing 10. A shaft 11 is journaled in the tubular hub 8 of the gear 9, this shaft 10 being also journaled in a ball bearing 12 arranged in a bore 13 in the opposite end of the casing 5. This bore 13 is in communication with the interior of the casing 5 through the space between the races of the ball bearing 12 and leakage of oil from the bore is prevented by a Welsh plug or sealing disk 14 which is set into the bore 13. A nut 15 is provided on the end of the shaft within the bore 13, this nut tightening against the inner race of the ball bearing 12 to hold the ball bearing and shaft axially in position in the bore 13.

The gear 9 is provided with spur teeth 18 meshing with the teeth of a spur pinion 19, this pinion 19 being integral with a countershaft 20. This countershaft 20 is arranged parallel with the shaft 11 and is shown as journaled at one end in a bearing bushing 21 mounted in a screw plug 22 in one end of the casing 5 and at its other end in a bearing bushing 23 in a bore 24 through the other end of the casing 5, this bore being shown as sealed by a Welsh plug or sealing disk 25.

The gear 9 is also provided with face jaws 28 adapted to engage the end jaws provided by the splineways 29 of a gear shift sleeve 30, these splineways 29 of the gear shift sleeve fitting splines 31 on the shaft 11 so that the gear shift sleeve 30 is compelled to rotate with the shaft 11 but can be moved axially along the shaft. This axial movement of the gear shift sleeve 30 is effected by a gear shift rod 32 which is slidably mounted in the gear case 5 for movement parallel with the shafts 11 and 20. One end of this gear shift rod 32 extends outwardly from the gear case 5 through a gland or stuffing box 33, so that it can be shifted manually, and within the gear case 5 this shifting rod carries a fork 34 which embraces the gear shift sleeve 30 and has its arms arranged in an annular peripheral groove 35 so that axial movement of the shifting rod 32 is transmitted to the gear shift sleeve 30.

In one extreme position of the gear shift sleeve 30 its splineways 29 interengage with the face jaws 28 of the gear 9 thereby to establish a direct drive between the drive sprocket 6 and the shaft 11. The gear shift sleeve 30 is also formed to provide spur gear teeth 38 which in the other extreme position of the gear shift sleeve 30 mesh with a spur gear 39 integral with the countershaft 20. When so engaged, the drive from the sprocket 6 to the shaft 11 is through the countershaft 20 and hence the speed of rotation of the shaft 11 is decreased.

The gear case 5 is provided with a cover 40 for access to the gear case in assembling the gearing and with a capped stand pipe 41 through which the gear case is filled with oil.

The end 45 of the shaft 11 which projects from the hub 8 of the gear 9 is tapered and this tapered end is provided with an axial end bore 46 leading to a tapered valve seat 48, the small end of this tapered valve seat 48 leading to a small bore 49 which extends axially to the opposite end of the shaft 11.

On this tapered end 48 of the shaft 11 is fixed, by means of a key 50 and a nut 51, the cylinder block 52 of a hydraulic clutch. This cylinder block is provided at one end with a cylindrical hub 53 which is arranged adjacent the drive sprocket 6 and hub 8 of the gear 9 and on this hub 53 is rotatably mounted the hub 54 of a cylindrical shell 55. This cylindrical shell 55 has an end wall 56 extending radially outward from the hub 54 and a peripheral cylindrical wall 58. It will particularly be noted that the inner cylindrical working face 59 of the cylindrical wall 58 is eccentric with reference to the axis of rotation of the shaft 11.

To the rim of the cylindrical wall 58 of the cylindrical shell 55 is secured, by screws 60, or in any other suitable manner, a circular cover plate 61, this cover plate having a closed hub 62 which is journaled on the cylindrical hub 63 of the cylinder block 52 which projects toward the end of the shaft 11. The screws 60 are also shown as securing a sprocket 64 to the cylindrical shell 55, this sprocket preferably being concentric with the axis of the shaft 11.

As best shown in Fig. 2, the cylinder block 52 is square in cross section in a plane extending perpendicularly to the axis of the shaft 11 and from the corresponding end of each of the four faces 65 is provided with a bore 66 which extends along the adjacent face 65 of the cylinder block to provide a cylinder. The axes of these cylinders 66 likewise describe a square which is concentric with the axis of the shaft 11 but it will be noted that the square formed by the four faces 65 of the cylinder block is offset, circumferentially, from the square described by the axes of the cylinders 66 so that the open end of each cylinder 66 slopes toward its adjacent wall 65. By this means each of the cylinders 66 is longer on that side which receives the side thrust from the pistons, as hereinafter described.

In each of the cylinders 66 is fitted a piston or plunger 68 each of which can be provided with a piston ring 69 to avoid leakage. The outer end 70 of each of these pistons 68 is of spherical form and a large bore 71 extends axially from the inner end of the piston to a point short of the spherical end 70 thereof. A smaller axial bore 72 extends inwardly from the spherical end 70 of each piston to the large bore 71 thereof. A helical compression spring 74 is arranged in each piston, one end being seated against the outer extremity of the piston and the other end being seated at the bottom of the cylinder 66. These springs 74 therefore urge the pistons 68 axially outward.

On the spherical end 70 of each piston is mounted a shoe 75, each shoe having a spherical socket 76 for this purpose. Each shoe is provided with a curved outer face 78 which conforms to the cylindrical working face 59 of the cylindrical shell 55 and with parallel side flanges 79 which ride along the side walls 56 and 61 of the cylindrical shell so as to hold the shoes in alinement. At its leading edge each shoe 75 is preferably formed to provide a wedge-shaped crevice 80, this crevice serving to provide a molecular congestion of the oil between each shoe 75 and the working face 59 and insuring proper lubrication therebetween.

Each shoe 75 is provided with a central port 81 which communicates with the bore 72 of the corresponding piston 68 and is open at the working face 76 of the shoe. As the cylinder 55 rotates relative to the cylinder block 52, these ports 81 pass into and out of communication with a semicircular groove 84 provided in the working face 59 of the cylindrical shell 55. The one end of this semicircular groove 84 terminates approximately in a plane intersecting the axis of the shaft 11 and the most salient portion of the cylindrical shell 55, and with the arrangements of parts as shown, this groove extends around the upper half of the cylindrical shell 55 as viewed in Fig. 2.

From the bottom of each cylinder 66 a bore 86 extends laterally to the tapered face of the shaft 11 and this tapered portion of the shaft 11 is provided with ports 88 which register, respectively, with these bores 86 and open into the tapered or conical valve seat 48 between the bores 46 and 49 of the shaft 11. The flow of oil from these ports 88 is controlled by a valve stem 89 having a tapering end moving toward and from the seat 48. For this purpose the valve stem 89 is arranged coaxially in the larger bore 46 of the shaft 11 and extends out through a stuffing box or gland 90 in the end wall of the hub 62 of the cover plate 61 for the cylinder 55. The axial adjustment of the valve stem 89 can be controlled from the exterior of the clutch in any suitable manner. A bore 91 is provided through the shaft 11 and cylinder block 52 and leads from the bore 49 in the shaft 11 to the chamber enclosed by the cylinder 55.

To prevent the pistons from possibly hanging up on encountering reverse torque, that is, reverse force from the driven sprocket 64 to the driving sprocket 6, as when going down hill or for any other reason, means are provided for insuring that the pressure of the springs 74 is always adequate to urge the pistons outwardly into engagement with the shoes 75 and the shoes into engagement with the working face 59 of the cylindrical shell 55. Otherwise the pistons might remain retracted on encountering the eccentric part of the cylindrical shell 55 and free the shoes 75 or at least cause an undesirable noise. The means for this purpose comprise a check valve 93 for each cylinder 66 which insures that the pressure of the oil in the chamber enclosed by the cylindrical shell 55 never substantially exceeds the pressure within the several cylinders 66.

For this purpose each shoe is provided with a bore 94 which extends parallel with the shaft 11 and one end of which is formed to provide a reduced annular shoulder 95 against which a ball 96 seats. This ball is urged toward this seat by a helical compression spring 97 in the bore 94, the other end of this spring 97 being seated against a screw plug 98 provided in the corresponding end of the bore 94. A passage 99 leads from each bore 94 to the corresponding port 81 so that when the balls 96 are forced back by the preponderating oil pressure in the cylindrical shell 55, oil will flow from this cylinder into the several cylinders 66.

A filling plug 100 can be provided in the cylinder 55 and suitable oil seals 101 and 102 can be provided at the hub of the sprocket 6. Further, to positively insure against any piston 68 losing its shoe 75, as, for example, if its spring 74 should break and wind up, the flanges 79 on opposite sides of these shoes preferably are curved to conform to the working face 59 of the cylindrical shell and ride in tracks or grooves 103 provided in the side wall 56 of the cylindrical shell 55 and its cover 61, respectively. It will be seen that any shoe which becomes wholly freed from its piston 68 is merely pushed around the tracks 103 and does not interfere with the working of the other parts of the clutch.

In the operation of the transmission, it is assumed that the cylindrical shell 55 of the clutch and the transmission casing 5 is filled with oil, this being supplied through the filling opening 41 and plug 100. Power from the drive sprocket 6 is transmitted to the shaft 11 either directly, through the jaws 28, or indirectly, through the countershaft 20, depending upon the position of the gear shift sleeve 30 as determined by the gear shift rod 32 and its yoke 34.

As the shaft 11 rotates, it rotates the cylinder block 52 keyed thereto, this moving the pistons 68 and their shoes 75 to travel around the cylindrical shell 55, the outer faces of these shoes traversing the working face 59 of this cylindrical shell. The cylindrical shell 55 is journaled on the eccentric hubs 53 and 63 of the cylinder block 52 and hence the rotation of this cylindrical shell is eccentric to the axis of the cylinder block 52. Consequently as the cylinder block rotates relative to the enclosing cylindrical shell 55, the pistons 68 are reciprocated in and out, the inward movement being effected by the inwardly offset part of the working face 59 and the outward movement of the pistons 68 being effected by the springs 74.

As the pistons 68 so reciprocate they tend to build up pressure in their cylinders 66, these cylinders being filled with oil. As long as the valve stem 89 remains retracted so as to expose the oil ports 88, the oil from the cylinder of an inwardly moving piston 68 is free to flow through its passage 86 and port 88 into the bore 48, 49 of the shaft 11. From the bore the oil is free to travel out through the opposite oil port 88 and its passage 86 into the opposite cylinder 66, the piston 68 of which is traveling outwardly at the same rate of speed as the inwardly moving piston first assumed. The oil so forced into the bore 49 of the shaft 11 can also escape through the passage 91 to the working chamber of the cylindrical shell 55. From this working chamber this oil can enter the cylinders 66 of the outwardly moving pistons 68, the shoes 75 of which at this time are traversing the groove 84 in the working face 59 of the enclosing cylindrical shell 55. Thus, the oil forced by the inwardly moving pistons into the working chamber of the enclosing cylindrical shell 55, through the passage 91, is free to escape through the groove 84, ports 81 of the shoes 75 and bores 72, 71 of the pistons 68 into the cylinders 66 of those pistons 68 which are moving outwardly at this time. It will therefore be seen that as long as the valve stem 89 remains retracted or open there is free interchange of the oil from the cylinders 66 of the inwardly moving pistons 68 to the cylinders 66 of the outwardly moving pistons 68, either directly across the ports 88 of these cylinders, or indirectly through the bore 49, passage 91, working chamber of the enclosing cylindrical shell 55, groove 84 and ports 81 and bores 71 of the outwardly moving pistons. Since no resistance, other than the slight resistance offered by friction, is made to the free reciprocation of the pistons 68, the cylindrical shell 55 is not rotated on the hubs 53 and 63, and hence the driven sprocket 64 fixed to this cylindrical shell 55 likewise remains stationary. This sprocket is fixed concentric with the shaft 11 so that it does not oscillate when the cylindrical shell 55 is turned.

To establish a drive, the operator shifts the valve rod 89 axially inward so as to close off, to the desired degree, the ports 88. It will be noted that on traversing the ungrooved portion of the face 59 of the enclosing cylindrical shell 55, the pistons 68 are moved inwardly by the eccentricity of this face, and that on traversing the groove 84 the pistons 68 are moved outwardly by their springs 74. Therefore, when the valve stem 89 is moved to completely seal the ports 88 the pistons are locked against inward movement and hence lock the enclosing cylindrical shell 55 to the cylinder block to rotate therewith. Thus, the cylinders 66 of those pistons 68 traversing the ungrooved half of the face 59, and which pistons would normally be moved inwardly by the eccentricity of the enclosing cylindrical shell 55, have their inner ports 88 sealed by the valve stem 89 and have their outer ports 81 sealed by the ungrooved half of the working face 59. Since no fluid can escape from the cylinders 66 of those pistons 68 traversing the ungrooved half of the working face 59 and since the eccentricity of this ungrooved half of this working face tends to drive these pistons inwardly, it will be seen that the shoes 75 of these pistons become wedged against this ungrooved half of the working face 59 to provide a positive interlock between the cylinder block 52 and the enclosing cylindrical shell 55. Consequently a positive drive is established between the driving pinion 6 and the driven pinion 64.

Any desired slippage of the clutch can be provided by adjusting the valve stem 89 to restrict the ports 88 to a corresponding degree. In such partially closed condition the pistons 68 are reciprocated and the fluid movement is the same as when the clutch is fully opened except that the movement of the pistons 68 is retarded so as to provide a yielding wedging action between the cylinder block 52 and the enclosing cylindrical shell 55, the degree of this yielding being, however, under positive control.

Thus, those cylinders 66 whose shoes 75 are traversing the groove 84 of the working face 59 are open to the interior of the enclosing cylindrical shell 55, the oil in this enclosing cylindrical shell 55 being free to flow through the groove 84, ports 81 and bores 72, 71 into these cylinders 66 as illustrated by the upper left hand cylinders 66 in Fig. 2. The springs 74 are therefore free to drive the pistons 68 outwardly while this grooved half of the face 59 is being traversed, the eccentricity of this grooved half of the face 59 permitting such outward movement of the pistons. When the port 81 of each shoe 75 reaches the end of the groove 84 it is closed by the face 59 of the enclosing cylindrical shell and at the same time the eccentricity of this face 59 starts to drive this shoe 75 and its piston 68 inwardly. Therefore, while the shoes 75 and pistons 68 are traversing the ungrooved half of the face 59 and are being driven inwardly thereby, the fluid in their cylinders 66 can only escape through the ports 88. As these ports 88 have been partly restricted by the valve stem 89 the rate of inward movement of these pistons 68 is determined by the rate of escape of the fluid through the ports 88, this, in turn, controlling the rate of travel of the shoes 75 along the ungrooved half of the face 59 and hence the degree of slippage between the cylinder block 52 and the enclosing cylindrical shell 55.

When the ports 88 are so partly restricted a part of the fluid escaping from these ports can flow directly through the opposite ports 88 and into the cylinders 66 of those pistons 68 which are traversing the grooved half of the working face 59 and hence are being moved outwardly by their springs 74. However, these opposite ports 88 are also restricted and hence a correspondingly increased amount of the oil escaping from the ports 88 of the inwardly moving pistons 68 will escape through the bore 49, and passage 91 to the interior of the enclosing cylinder 55 where it is free to enter the cylinders 66 of the outwardly moving pistons through the groove 84, ports 81 and bores 72, 71.

It will be observed that on reverse torque, that is, when the enclosing cylindrical shell 55 and its sprocket 64 become the driver as when going down a steep grade, the clutch becomes free wheeling or opens to permit coasting regardless of the position of the valve rod 89. Thus, under this reverse torque condition the grooved half of the face 59 becomes that part which drives the pistons 66 inwardly and the ungrooved half of this face 59 becomes that part which releases the pistons. Since the cylinders 66 of the pistons 68 so being driven inwardly by the grooved half of the face 59 are open to the interior of the enclosing cylinder 55 through their bores 71, 72, ports 81 and the groove 84, it is apparent that the shoes of these pistons cannot wedge against the grooved half of the face 59 to establish a drive on reverse torque. On the other hand, if the valve stem 89 were adjusted at this time to fully seal the ports 88, when each shoe 75 reached the end of the groove 84 both ends of its cylinder 66 would be sealed and since the springs 74 would probably not be powerful enough to establish a vacuum in the cylinders 66 while traversing the ungrooved half of the face 59, means are provided for admitting fluid to the cylinders 66 at this time.

While various means could be employed for this purpose, the simple check valve 93 for each cylinder 66 is satisfactory. It will be noted that each check valve 93 opens toward its cylinder 66 and hence insures that the pressure in the enclosing cylindrical shell 55 never substantially exceeds the pressure in each cylinder 66. Thus, on reverse torque, when each shoe 75 encounters the ungrooved half of the face 59 the lowered pressure in its cylinder 66, induced by its spring 74, opens its check valve 93 so that fluid is free to flow from the enclosing cylinder 55, past the check valve 93 and through the passage 99, port 81 and bore 71, 72 into the corresponding cylinder 66. The shoes 75 are thereby rendered free to track along the face 59 on reverse torque. These check valves 93 are only operative under conditions of reverse torque and hence the wear is slight.

Since the clutch as shown is open on reverse torque, it will be seen that it could be used as a so-called free-wheeling clutch, independent of any other control. Thus, the inner ends of the cylinders 66 could be blind or permanently sealed, and the clutch would function to drive in one direction but be open when conditions of reverse torque are encountered.

It will be noted that in action, the centrifugal force tends to build up pressure in the outer part of the clutch thereby to insure the full feed of fluid to the cylinders 66 through the groove 84. A further feature of the invention resides in the mounting of the cylinders with their axes forming a square surrounding the axis of the shaft 11. This provides, in effect, a lever arm supporting each plunger or piston 68 which not only brings the pistons closer into axial alinement with the opposing force of the enclosing cylinder 55 but also greatly reduces side thrust of each plunger or piston 68 against its cylinder walls. The plungers can accordingly be made smaller and the simple ball-and-socket joint between each plunger 68 and its shoes 75 is feasible. Further, as the liquid in the clutch expands or contracts under temperature change, this liquid is free to flow back and forth between the enclosing cylinder 55 and the transmission case 5 through the bore 49 and passage 91 in the shaft 11. This further renders the gear or transmission case 5 a large reservoir for the clutch fluid since the level in the transmission case would have to drop below the bore 49 of the shaft 11 before the clutch would lose its oil. There is also a degree of interchange between the oil in the clutch and the oil in the transmission case so that the surfaces of both are available to cool the oil. Further, if air should get caught in the top of the cylindrical shell 55, as in failing to bleed the plug 100, this body of air would be driven into the cylinders 66 by the centrifugal force of the liquid, and this air would bubble along the bore 11 to the transmission casing 5 and be vented. A partially filled condition of the clutch is therefore self-remedying within a comparatively short length of time.

The present invention therefore provides a very simple, compact and strong hydraulic clutch which is unidirectional in its action and is automatically opened in the opposite direction. The clutch is also free from wearing difficulties, particularly if a wedge-shaped crevice 80 is left at the nose of each shoe to provide a molecular congestion of the liquid therein. The clutch also has the numerous specific advantageous features heretofore discussed.

I claim:

1. A clutch of the character described for releasably coupling a driving part and a driven part, comprising a cylinder block secured to rotate with one of said parts, a cylindrical shell enclosing said cylinder block and secured to rotate with the other of said parts with its axis parallel with but in eccentric relation to the axis of said cylinder block and forming a chamber containing a liquid surrounding said cylinder block, said cylinder block being formed to provide a plurality of cylinders open at their outer ends and each arranged with its axis in a plane at right angles to the axis of said cylinder block, a piston in each of said cylinders and projecting outwardly therefrom, a shoe secured to the outer end of each of said pistons and having a face engaging the inner cylindrical face of said cylindrical shell to reciprocate said pistons in response to the rotation of said cylindrical shell relative to said cylinder block, each of said pistons being provided with a bore communicating with the corresponding cylinder and each of said shoes being provided with an internal passage registering with the bore of the corresponding piston, and means for admitting liquid from said chamber through each of said passages and the corresponding bore to the corresponding cylinder when the piston is moving outwardly in following the corresponding half of said inner cylindrical face and restraining the reverse movement of said fluid through said passage and bore when said piston is moving inwardly in following the other half of said inner cylindrical face.

2. A clutch of the character described for releasably coupling a driving part and a driven part, comprising a cylinder block secured to rotate with one of said parts, a cylindrical shell enclosing said cylinder block and secured to rotate with the other of said parts with its axis parallel with but in eccentric relation to the axis of said cylinder block and forming a chamber containing a liquid surrounding said cylinder block, said cylinder block being formed to provide a plurality of cylinders open at their outer ends and each arranged with its axis in a plane at right angles to the axis of said cylinder block, a piston in each of said cylinders and projecting outwardly therefrom, a shoe secured to the outer end of each of said pistons and having a face engaging the inner cylindrical face of said cylindrical shell to reciprocate said pistons in response to the rotation of said cylindrical shell relative to said cylinder block, each of said pistons being provided with a bore communicating with the corresponding cylinder and each of said shoes being provided with an internal passage registering with the bore of the corresponding piston, and means for admitting liquid from said chamber through each of said passages and the corresponding bore to the corresponding cylinder when the piston is moving outwardly in following the corresponding half of said inner cylindrical face and restraining the reverse movement of said liquid through said passage and bore when said piston is moving inwardly in following the other half of said inner cylindrical face, comprising a circumferential groove provided in said corresponding half of said inner cylindrical face and arranged to register with a port provided by the said passage in each of said shoes.

3. A clutch of the character described for releasably coupling a driving part and a driven part, comprising a cylinder block secured to rotate with one of said parts, a cylindrical shell enclosing said cylinder block and secured to rotate with the other of said parts with its axis parallel with but in eccentric relation to the axis of said cylinder block and forming a chamber containing a liquid surrounding said cylinder block, said cylinder block being formed to provide a plurality of cylinders open at their outer ends and each arranged with its axis in a plane at right angles to the axis of said cylinder block, a piston in each of said cylinders and projecting outwardly therefrom, a shoe secured to the outer end of each of said pistons and having a face engaging the inner cylindrical face of said cylindrical shell to reciprocate said pistons in response to the rotation of said cylindrical shell relative to said cylinder block, each of said pistons being provided with a bore communicating with the corresponding cylinder and each of said shoes being provided with a passage communicating with the bore of the corresponding piston, means for admitting liquid from said chamber through each of said passages and the corresponding bore to the corresponding cylinder when the piston is moving outwardly in following the corresponding half of said inner cylindrical face and restraining the reverse movement of said fluid through said passage and bore when said piston is moving inwardly in following the other half of said inner cylindrical face, comprising a circumferential groove provided in said corresponding half of said inner cylindrical face and arranged to register with a port provided by the said passage in each of said shoes, means at the inner end of each cylinder and permitting the escape of liquid from said cylinders when the pistons are so moving inwardly in following said other half of said inner cylindrical face, and means adjustably controlling said escape of liquid to permit a corresponding slippage of the clutch.

4. A clutch of the character described for releasably coupling a driving part and a driven part, comprising a cylinder block secured to rotate with one of said parts, a cylindrical shell enclosing said cylinder block and secured to rotate with the other of said parts with its axis parallel with but in eccentric relation to the axis of said cylinder block and forming a chamber containing a liquid surrounding said cylinder block, said cylinder block being formed to provide a plurality of cylinders open at their outer ends and each arranged with its axis in a plane at right angles to the axis of said cylinder block, a piston in each of said cylinders and projecting outwardly therefrom, a shoe having a ball-and-socket connection with the outer end of each piston to provide continuously engaging faces therebetween, each of said shoes also having a face engaging the inner cylindrical face of said enclosing cylinder to reciprocate said pistons in response to the rotation of said cylinder block relative to said cylindrical shell, each of said pistons being provided with a bore communicating with the corresponding cylinder and each of said shoes being provided with a passage communicating through the faces of said ball-and-socket joint with the bore of the corresponding piston, and means for admitting liquid from said chamber through each of said passages to the corresponding cylinder when the piston therein is moving outwardly in following the corresponding half of said inner cylindrical face and restraining a reverse flow of said admitted liquid when each piston is moving inwardly in following the other half of said inner cylindrical face.

5. A clutch of the character described for releasably coupling a driving part and a driven part, comprising a cylinder block secured to rotate with one of said parts, a cylindrical shell enclosing said cylinder block and secured to rotate with the other of said parts with its axis parallel with but in eccentric relation to the axis of said cylinder block and forming a chamber containing a liquid surrounding said cylinder block, said cylinder block being formed to provide a plurality of cylinders open at their outer ends and each arranged with its axis in a plane at right angles to the axis of said cylinder block, a piston in each of said cylinders and projecting outwardly therefrom, a shoe secured to the outer end of each of said pistons and having a face engaging the inner cylindrical face of said cylindrical shell to reciprocate said pistons in response to the rotation of said cylindrical shell relative to said cylinder block, each of said pistons being provided with a bore communicating with the corresponding cylinder and each of said shoes being provided with an internal passage registering with the bore of the corresponding piston, and means for admitting liquid from said chamber through each of said passages and the corresponding bore to the corresponding cylinder when the piston is moving outwardly in following the corresponding half of said inner cylindrical face and restraining the reverse movement of said fluid through said passage and bore when said piston is moving inwardly in following the other half of said inner cylindrical face and including a check valve opening from said chamber toward the corresponding bore.

6. A clutch of the character described for releasably coupling a driving part and a driven part, comprising a cylinder block secured to rotate with one of said parts, a cylindrical shell enclosing said cylinder block and secured to rotate with the other of said parts with its axis parallel with but in eccentric relation to the axis of said cylinder block and forming a chamber containing a liquid surrounding said cylinder block, said cylinder block being formed to provide a plurality of cylinders open at their outer ends and each arranged with its axis in a plane at right angles to the axis of said cylinder block, a piston in each of said cylinders and projecting outwardly therefrom, a shoe secured to the outer end of each of said pistons and having a face engaging the inner cylindrical face of said cylindrical shell to reciprocate said pistons in response to the rotation of said cylindrical shell relative to said cylinder block, each of said pistons being provided with a bore communicating with the corresponding cylinder and each of said shoes being provided with a passage communicating with the bore of the corresponding piston, and means for admitting liquid from said chamber through each of said passages and the corresponding bore to the corresponding cylinder when the piston is moving outwardly in following the corresponding half of said inner cylindrical face and restraining the reverse movement of said fluid through said passage and bore when said piston is moving inwardly in following the other half of said inner cylindrical face, each of said shoes being provided on its opposite sides with flanges conforming to the inner cylindrical face of said cylindrical shell and the opposite side walls of said shell being formed to provide circular tracks engaging said flanges to retain said shoes against the inner cylindrical face of said shell.

7. A clutch of the character described for releasably coupling a driving part and a driven part, comprising a cylinder block secured to rotate with one of said parts and being square in cross section in a plane at right angles to its axis, a cylindrical shell enclosing said cylinder block and secured to rotate with the other of said parts with its axis parallel with but in eccentric relation to the axis of said cylinder block and forming a chamber containing a liquid surrounding said cylinder block, said cylinder block being formed to provide a plurality of cylinders open at their outer ends and having their axes arranged in said plane and extending alongside the corresponding outer walls of said cylinder block, the square defined by the axes of said cylinders being offset circumferentially relative to the square defined by the square outer walls of said cylinder block so that each cylinder slopes toward the corresponding outer wall of said cylinder block at its open end, a piston in each of said cylinders and projecting outwardly therefrom, means at the outer end of each piston engaging the inner cylindrical face of said cylindrical shell to reciprocate said pistons in response to the rotation of said cylinder block relative to said cylindrical shell, and means for admitting liquid directly from said chamber to each cylinder when the piston therein is moving outwardly in following the corresponding half of said inner cylindrical face and restraining a reverse flow of said admitted liquid when each piston is moving inwardly in following the other half of said inner cylindrical face.

8. A clutch of the character described for releasably coupling a driving part and a driven part, comprising a cylinder block secured to rotate with one of said parts, a cylindrical shell enclosing said cylinder block and secured to rotate with the other of said parts with its axis parallel with but in eccentric relation to the axis of said cylinder block and forming a chamber containing a liquid surrounding said cylinder block, said cylinder block being formed to provide a plurality of cylinders open at their outer ends and each arranged with its axis in a plane generally at right angles to the axis of said cylinder block and said axes of said cylinders being at an angle to each other to form a regular polygon concentric with the axis of said cylinder block, a piston in each cylinder and projecting outwardly therefrom, and provided with a rounding face at its outer end, a shoe having a rounding face movably contacting the said rounding face at the outer end of each piston and having a face fitting the inner cylindrical face of said cylindrical shell to reciprocate said pistons in response to the rotation of said cylindrical shell relative to said cylinder block, each of said pistons being provided with a bore communicating with its cylinder, and means for admitting liquid from said chamber through each of said bores when said piston is moved outwardly in following the corresponding half of said inner cylindrical face and restraining a reverse flow of said admitted liquid through each bore when the corresponding piston is moving inwardly in following the other half of said inner cylindrical face.

9. A clutch of the character described for releasably coupling a driving part and a driven part, comprising a cylinder block secured to rotate with one of said parts, a cylindrical shell enclosing said cylinder block and secured to rotate with the other of said parts with its axis parallel with but in eccentric relation to the axis of said cylinder block and forming a chamber containing a liquid surrounding said cylinder block, said cylinder block being formed to provide a plurality of cylinders open at their outer ends and each arranged with its axis in a plane generally at right angles to the axis of said cylinder block and said axes of said cylinders being at an angle to each other to form a regular polygon concentric with the axis of said cylinder block, a piston in each cylinder and projecting outwardly therefrom, a shoe movably mounted directly on the outer end of each piston and having a face fitting the inner cylindrical face of said cylindrical shell to reciprocate said pistons in response to the rotation of said cylindrical shell relative to said cylinder block, each of said pistons being provided with a bore communicating with its cylinder, and each of said shoes being provided with an internal passage registering with the bore of the corresponding piston, and means for admitting liquid from said chamber through each of said passages and the corresponding bore when the piston is moving outwardly in following the corresponding half of said inner cylindrical face and restraining the reverse movement of said fluid through said passage and bore when said piston is moving inwardly in following the other half of said inner cylindrical face.

10. A clutch of the character described for releasably coupling a driving part and a driven part, comprising a cylinder block secured to rotate with one of said parts, a shell enclosing said cylinder block and secured to rotate with the other of said parts with its axis parallel with but radially inwardly facing working face in eccentric relation to the axis of said cylinder block and forming a chamber containing a liquid surrounding said cylinder block, said cylinder block being formed to provide a plurality of cylinders open at their outer ends and each arranged with its axis in a plane generally at right angles to the axis of said cylinder block, a piston in each of said cylinders and projecting outwardly therefrom, a shoe movably secured to the outer end of each of said pistons and having a face engaging said working face of said shell to reciprocate said pistons in response to the rotation of said shell relative to said cylinder block, each of said pistons being provided with a bore communicating with the corresponding cylinder and each of said shoes being provided with an internal passage registering with the bore of the corresponding piston, and means for admitting liquid from said chamber through each of said passages and the corresponding bore to the corresponding cylinder when the piston is moving outwardly in following the corresponding part of said working face and restraining the reverse movement of liquid through said passage and bore when said piston is moving inwardly in following the corresponding part of said working face, comprising a circumferential groove provided in said shell along said first corresponding part of said working face and arranged to register with a post provided by the said passage in each of said shoes.

11. A clutch of the character described, for releasably coupling a driving part and a driven part, comprising a cylinder block secured to rotate with one of said parts, a shell enclosing said cylinder block and secured to rotate with the other of said parts with its axis parallel with but having a radially inwardly facing working face in eccentric relation to the axis of said cylinder block and forming a chamber containing a liquid surrounding said cylinder block, said cylinder block being formed to provide a plurality of cylinders open at their outer ends and each arranged with its axis in a plane generally at right angles to the axis of said cylinder block, a piston in each of said cylinders and projecting outwardly therefrom, a shoe having a rounding extension and socket connection with the outer end of each piston to provide continuously engaging faces therebetween, each of said shoes also having a face engaging said working face of said shell to reciprocate said pistons in response to the rotation of said shell relative to said cylinder block, each of said pistons being provided with a bore communicating with the corresponding cylinder and each of said shoes being provided with a passage communicating through the faces of said rounding extension and socket joint with the bore of the corresponding piston, and means for admitting liquid from said chamber through each of said passages to the corresponding cylinder when said piston is moved outwardly in following the corresponding part of said working face and restraining a reverse flow of said admitted liquid when each piston is moved inwardly in following the corresponding part of said working face.

12. A clutch of the character described for releasably coupling a driving part and a driven part, comprising a cylinder block secured to rotate with one of said parts, a shell enclosing said cylinder block and secured to rotate with the other of said parts with its axis parallel with but having a radially inwardly facing working face in eccentric relation to the axis of said cylinder block and forming a chamber containing a liquid surrounding said cylinder block, said cylinder block being formed to provide a plurality of cylinders open at their outer ends and each arranged in a plane generally at right angles to the axis of said cylinder block, a piston in each of said cylinders and projecting outwardly therefrom, a shoe movably secured to the outer end of each of said pistons and having a face engaging said working face of said shell to reciprocate said pistons in response to the rotation of said shell relative to said cylinder block, each of said pistons being provided with a bore communicating with the corresponding cylinder and each of said shoes being provided with an internal passage registering with the bore of the corresponding piston, and means for admitting liquid from said chamber through each of said passages and the corresponding bore to the corresponding cylinder when the piston is moving outwardly in following the corresponding part of said working face and restraining the reverse movement of said liquid through said passage and bore when said piston is moving inwardly in following the corresponding part of said working face, each of said shoes being provided on its opposite sides with flanges generally conforming to the face of said shoe engaging said working face of said shell and the opposite side walls of said shell being formed to provide endless tracks receiving said flanges to retain said shoes in operative relation to said working face of said shell.

ALBERT F. HICKMAN.

REFERENCES CITED

The following references are of record in the file of this patent:

UNITED STATES PATENTS

| Number | Name | Date |
| --- | --- | --- |
| 563,989 | Storey | July 14, 1896 |
| 851,129 | Goodner et al. | Apr. 23, 1907 |
| 1,105,792 | Jessen | Aug. 4, 1914 |
| 1,227,910 | Hubbard | May 29, 1917 |
| 1,336,749 | Jessen | Apr. 13, 1920 |
| 2,077,580 | Patterson | Apr. 20, 1937 |
| 2,270,536 | Lenning | Jan. 20, 1942 |
| 2,303,829 | Dodge | Dec. 1, 1942 |
| 2,307,676 | Harlan | Jan. 5, 1943 |